(No Model.)

W. H. WOODS.
Sled for Hauling Fodder.

No. 228,967.  Patented June 15, 1880.

WITNESSES:
Chas. Nidn.
C. Sedgwick

INVENTOR:
W. H. Woods.
BY Munn & Co.
ATTORNEYS.

UNITED STATES PATENT OFFICE.

WILLIAM H. WOODS, OF ELIZABETH TOWNSHIP, ALLEGHENY COUNTY, PA.

SLED FOR HAULING FODDER.

SPECIFICATION forming part of Letters Patent No. 228,967, dated June 15, 1880.

Application filed April 14, 1880. (No model.)

*To all whom it may concern:*

Be it known that I, WILLIAM HENRY WOODS, of Elizabeth township, in the county of Allegheny and State of Pennsylvania, have invented a new and useful Improvement in Sleds for Hauling Corn and Fodder in the Shock, of which the following is a specification.

Figure 1:
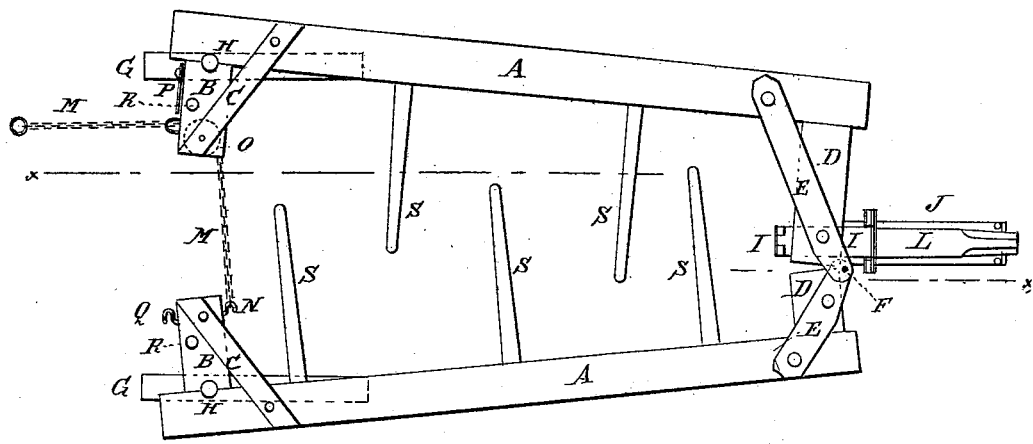
Figure 2:
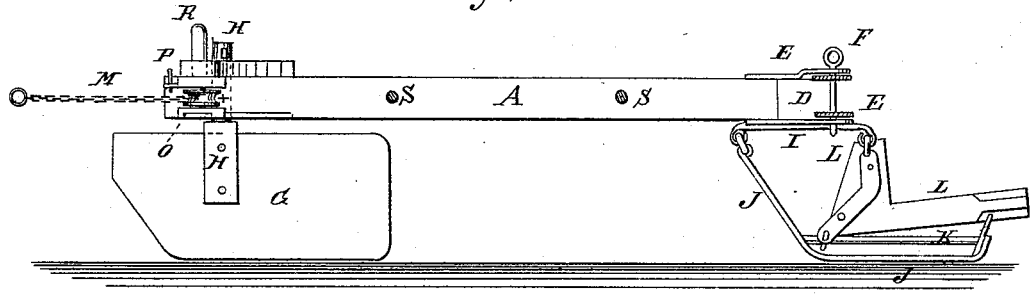
Figure 3:
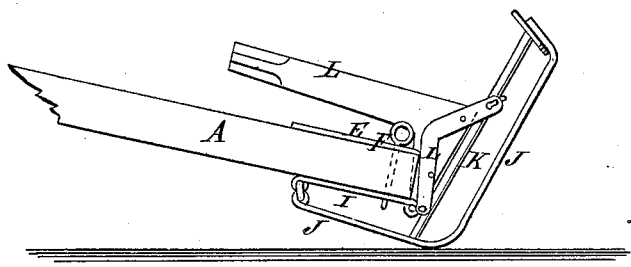

Figure 1 is a plan view of the improvement. Fig. 2 is a sectional side elevation taken through the broken line $x\ x$, Fig. 1. Fig. 3 is a side elevation of the rear end of the sled lowered.

Similar letters of reference indicate corresponding parts.

The object of this invention is to furnish a sled for hauling corn and fodder in the shock and hay in the cock, which shall be so constructed as to take up a shock or cock, carry it to the desired place, and place it upon the ground in the same position which it had before being moved.

The invention consists in constructing a shock-hauling sled of the side bars having alternating pins, the short bars and braces, the hinging-pin, the swiveled forward runners, the hinged rear runner having rod, the hinged angle-lever, the chain and its hooks and pulley, whereby a shock can be grasped, raised, drawn to any desired place, and placed upon the ground in its former position, as will be hereinafter fully described.

A represents the side bars of the sled, to the inner sides of the forward ends of which are attached short inwardly-projecting bars B, which are strengthened in position by braces C. The bars B are made of equal length, so that their inner ends may meet in the center of the space between the side bars, A.

To the inner sides of the rear ends of the side bars, A, are attached short inwardly-projecting bars D, which are strengthened in position by braces E. The bars D are made of unequal length, and the ends of the braces E project and are perforated to receive the pin F, to hinge the rear ends of the two parts of the sled to each other.

G are two runners, to the upper part of each of which, a little in front of its center, is attached the forked lower end of a swiveling-pin, H, which is swiveled in a hole in the outer end of the short cross-bar B, so that the runners G may follow the course of the team as it turns to the right or left.

To the under side of the inner end of the longer bar D is attached a bar or plate, I, to the forward end of which is hinged the upper end of a bar, J. The bar J inclines downward and rearward, and is bent to the rearward, to adapt it to serve as a runner to carry the rear end of the sled. The rear end of the runner J is bent upward, and to it and to the inclined forward part of the said runner are attached the ends of a rod, K, to which is pivoted and upon which slides the angle of the angle-lever L. The end of the short arm of the lever L is hinged to the rear end of the bar I. The rear end of the lever L projects into such a position that it can be conveniently grasped and operated.

By this construction, by swinging the free end of the lever L upward and forward the runner J will be brought into the position shown in Fig. 3 and the rear end of the sled will be lowered. By swinging the free end of the lever L rearward and downward the runner J will be brought into the position shown in Fig. 2 and the rear end of the sled will be raised.

M is a chain, one end of which is hooked upon a hook, N, attached to the rear side of the inner end of one of the bars B. The chain M is passed around a pulley, O, pivoted in a slot in the inner end of the other bar B. To the bar B is pivoted a hook, P, which may be hooked into a link of the chain M, to prevent the said chain from being drawn back when the draft-strain is slackened. To the forward side of the inner end of the other bar B is attached a hook, Q, upon which the forward part of the chain M is hooked, so that the draft can be applied to the said chain midway between the hooks P Q, and thus in the central line of the sled. To the cross-bars B are attached pins R for the free end of the chain M to be wound around, and thus kept from dragging upon the ground. To the inner sides of the side bars, A, are attached pins S, which alternate with each other, as shown in Fig. 1.

In using the sled the rear end is lowered, the forward end is spread apart, and the two parts drawn upon the opposite sides of the shock to be moved. The forward end of the parts of the sled are then drawn toward each other by draft applied to the chain M, forcing the pins S into the shock. The chain M is then secured in place by the hooks P Q, and the lever L is operated to raise the rear end of the sled, which raises the shock from the ground, so that it can be readily drawn where desired. When the shock has been drawn to the required place the rear end of the sled is lowered, which allows the butts of the shock to rest upon the ground in the same position in which it stood before being moved. The pin F is then withdrawn, the rear ends of the parts of the sled are drawn apart, and the sled drawn away from the shock. The pin F is then inserted, and the sled may be drawn back for another load. With this construction, also, the rear end of the sled, when going down hill, may be lowered to allow the butts of the shock to drag upon the ground, and thus serve as a brake to the sled.

Having thus described my invention, I claim as new and desire to secure by Letters Patent—

1. An improved sled for hauling shocks of corn and fodder, constructed substantially as herein shown and described, consisting of the side bars, A, having pins S, the short bars and braces B D C E, the hinging-pin F, the swiveled runners G, the hinged runner J, having rod K, the angle-lever L, the chain M, the hooks N P Q, and the pulley O, whereby a standing shock may be raised from the ground, drawn any desired distance, and placed upon the ground in its former position, as set forth.

2. In a shock-hauling sled, the combination, with the hinged rear end, D E F, of the sled, of the hinged runner J, having rod K, and the angle-lever L, substantially as herein shown and described, whereby the rear end of the sled can be lowered and raised, as set forth.

WILLIAM HENRY WOODS.

Witnesses:
CORNELIUS CARSON,
BARTEMOUS DUNLEVY.